(12) United States Patent
Fairy

(10) Patent No.: US 7,396,226 B2
(45) Date of Patent: Jul. 8, 2008

(54) NOZZLE SEALING ASSEMBLY

(75) Inventor: Fabrice Fairy, Georgetown (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 300 days.

(21) Appl. No.: 11/373,600

(22) Filed: Mar. 10, 2006

(65) Prior Publication Data

US 2007/0212444 A1    Sep. 13, 2007

(51) Int. Cl.
 B29C 45/20   (2006.01)
(52) U.S. Cl. ........................ 425/549; 425/572
(58) Field of Classification Search ............... 425/549, 425/572, 562, 563, 564, 565, 566
See application file for complete search history.

(56) References Cited

U.S. PATENT DOCUMENTS

| | | | |
|---|---|---|---|
| 3,822,856 A | 7/1974 | Gellert | |
| 4,268,240 A * | 5/1981 | Rees et al. | 425/549 |
| 4,304,544 A | 12/1981 | Crandell | |
| 4,344,750 A * | 8/1982 | Gellert | 425/549 |
| 4,517,453 A | 5/1985 | Tsutsumi | |
| 4,663,811 A | 5/1987 | Gellert | |
| 4,705,473 A * | 11/1987 | Schmidt | 425/549 |
| 4,900,560 A | 2/1990 | Trakas | |
| 4,981,431 A | 1/1991 | Schmidt | |
| 5,049,062 A | 9/1991 | Gellert | |
| 5,139,724 A | 8/1992 | Hofstetter et al. | |
| 5,208,052 A | 5/1993 | Schmidt et al. | |
| 5,254,305 A | 10/1993 | Fernandez et al. | |
| 5,268,184 A | 12/1993 | Gellert | |
| 5,269,676 A | 12/1993 | Gellert | |
| 5,299,928 A | 4/1994 | Gellert | |
| 5,316,468 A | 5/1994 | Gunther | |
| 5,326,251 A | 7/1994 | Gellert | |
| 5,464,343 A | 11/1995 | Hepler | |
| 5,492,467 A | 2/1996 | Hume et al. | |
| 5,554,395 A | 9/1996 | Hume et al. | |
| 5,736,171 A | 4/1998 | McGrevy | |
| 5,820,899 A | 10/1998 | Gellert et al. | |
| 5,871,786 A | 2/1999 | Hume et al. | |
| 5,885,628 A | 3/1999 | Swenson et al. | |
| 5,980,237 A | 11/1999 | Swenson et al. | |
| 6,009,616 A | 1/2000 | Gellert | |
| 6,162,044 A | 12/2000 | Babin | |
| 6,227,461 B1 | 5/2001 | Schroeder et al. | |
| 6,318,990 B1 | 11/2001 | Gellert et al. | |
| 6,390,803 B1 | 5/2002 | Christen | |
| 6,609,902 B1 | 8/2003 | Blais et al. | |
| 6,625,873 B1 | 9/2003 | Gellert | |
| 6,688,875 B2 | 2/2004 | Babin | |

(Continued)

FOREIGN PATENT DOCUMENTS

DE    197 42 099 A1    4/1998

(Continued)

*Primary Examiner*—Tim Heitbrink
(74) *Attorney, Agent, or Firm*—Medler Ferro PLLC

(57) ABSTRACT

A nozzle sealing assembly includes a cup-shaped nozzle seal cap and a sealing ring. The nozzle seal cap is coupled to a nozzle body and surrounds a tip portion of the nozzle body. The sealing ring is coupled to an outer surface of the nozzle seal cap and provides a sealing surface that is configured to slidably contact an adjacent mold plate.

27 Claims, 10 Drawing Sheets

U.S. PATENT DOCUMENTS

| | | |
|---|---|---|
| 6,709,262 B2 | 3/2004 | Fong |
| 6,789,745 B1 | 9/2004 | Babin et al. |
| 6,821,112 B2 | 11/2004 | Eigler et al. |
| 2002/0168442 A1 | 11/2002 | Gould et al. |
| 2005/0019444 A1 | 1/2005 | Sicilia et al. |

FOREIGN PATENT DOCUMENTS

| | | |
|---|---|---|
| EP | 0 021 273 | 9/1984 |
| EP | 0 186 413 A2 | 7/1986 |
| EP | 0 186 413 A3 | 4/1988 |
| EP | 0447573 | 9/1991 |
| EP | 0 824 751 A2 | 5/1998 |
| EP | 0 842 751 A3 | 6/1999 |
| EP | 1 231 041 A1 | 8/2002 |
| EP | 1 231 041 B1 | 9/2004 |
| FR | 2 591 936 | 6/1987 |
| JP | 60-206613 | 10/1985 |
| JP | 08-052767 | 2/1996 |
| JP | 2005-132026 | 5/2005 |
| WO | WO-90-03876 | 4/1990 |
| WO | WO-2005/090051 A1 | 9/2005 |

* cited by examiner

NOZZLE SEALING ASSEMBLY

BACKGROUND OF THE INVENTION

1. Field of the Invention

The invention relates to injection molding, and particularly to a nozzle sealing assembly for edge-gated injection molding nozzles.

2. Background of the Invention

Injection molding is a common manufacturing practice. Various articles of commercial value such as plastic bottles, toothbrushes, and children's toys, are made using well-known injection molding techniques. Injection molding generally involves melting a material, which is often plastic, then forcing the melt stream at high temperatures and pressures through one or more gates into a mold cavity. The melt cools in the shape of the mold cavity, which is opened to eject the finished part.

The melt is supplied from a machine nozzle, injected into a heated manifold and distributed to the mold cavities through heated nozzles. The heated nozzles are seated within bores in a mold plate that forms the cavities. The mold plate is cooled so that melt injected into the cavities can be adequately cooled prior to ejection. However, because the nozzle is heated and the mold plate is cooled, heat from the nozzle is drawn from the nozzle into the mold plate, which can create difficulty in maintaining the melt at an optimum temperature in the nozzle. As a result, it is often desirable to configure the injection molding system to reduce heat transfer from the nozzles to the mold plate, especially proximal to the mold gates, while still maintaining an adequate seal between each nozzle and a respective mold gate.

Front-gated nozzles often include an alignment collar and a transfer seal to maintain the position of the nozzle in the mold plate and to provide a seal between the nozzle and the mold plate. In some systems, the alignment collar and transfer seal suspend the nozzle body within a bore in the mold plate so that there is no direct contact between the nozzle body and mold plate. To further reduce heat transfer between the nozzle and the mold plate, the alignment collar and transfer seal are constructed from materials that are less thermally conductive than the nozzle body or the mold plate, and/or they are configured to reduce the contacting surface area between the components. During mold cycles the temperature of the injection molding system components fluctuate resulting in thermal expansion and contraction of those components. During the temperature cycles, sealing between the nozzle and the mold gate can be maintained by sliding contact between the transfer seal and the mold plate.

Some molding operations require edge-, or side-, gated nozzles. Edge-gated nozzles are used when a mold cavity is spaced radially from the longitudinal axis of the nozzle and melt must be distributed from the nozzle transversely with respect to the longitudinal axis of the nozzle body. Edge-gated nozzles employ one or more nozzle tips extending radially outward from the nozzle body to provide a path for melt to flow radially outward from the nozzle body.

One approach for providing a seal between a nozzle tip and a mold gate in edge-gated nozzles is to utilize individual edge gate seals or inserts that contact the mold plate adjacent to the mold gate. The gate seals are configured to slide with respect to the mold plate during thermal expansion. A disadvantage of such seals is that they form a thermal conduction path between the nozzle body and the mold plate close to the mold gate. In addition, it has been found that allowing melt to flow into a gap between the nozzle tip and mold plate may be beneficial and such thermal seals do not allow for such a gap.

Another device utilizing individual seals employs a nozzle tip that includes a sealing flange spaced from the tip outlet by an annular recess. The sealing flange has a contacting surface that is configured to contact the mold plate and seal around the mold gate. The outlet of the tip is recessed so that a gap is formed between the portion of the tip where the outlet is located and the mold gate when the sealing flange contacts the mold plate. As a result, a small cavity is formed between the tip and the mold plate that is filled with melt during operation. Although the device provides the benefit of the gap between the tip and mold plate, the proximity of the sealing flange with the mold gate provides a thermal conduction path that is close to the mold gate.

Another approach for providing a seal between a nozzle tip and a mold gate in edge-gated nozzles is to utilize a single seal between the nozzle body and the mold plate at a location spaced from the nozzle tip and mold gate. In one device, a sealing sleeve that contacts both the nozzle body and the mold plate is provided. The sealing sleeve surrounds a portion of the nozzle body spaced from the nozzle tip and mold gate. A shoulder is provided on the outer surface of the nozzle body to locate the sleeve longitudinally on the nozzle body. An upper portion of the sleeve is held in place on the nozzle body by a press fit or threaded engagement with the nozzle body. A lower portion of the outer surface of the sealing sleeve is configured such that there is sliding contact between the sealing sleeve and the mold plate. A sealing ring is also provided between the sealing sleeve and the nozzle body to improve the seal between the sleeve and the nozzle body and to prohibit melt from flowing between the sealing sleeve and the nozzle body. A gap is provided between the nozzle tips and mold gates so that melt is free to flow into a cavity created between the nozzle body, sealing sleeve and mold plate. A disadvantage of such a device is that the nozzle body must be specially configured to receive the sealing sleeve, e.g., the nozzle body must include a shoulder. Another disadvantage of the device is that mounting the sealing sleeve to the nozzle body requires either an additional press fit operation or a further complicated nozzle body design.

Another device that utilizes a single seal between the nozzle body and mold plate utilizes a sealing ring stopper sleeve and a sealing ring. The sealing ring stopper sleeve is brazed to an end portion of the nozzle body and the sealing ring is slid onto the stopper sleeve so that it abuts a shoulder provided on the stopper sleeve. Although the nozzle body does not require a special configuration in such a device, manufacture of the device requires an additional brazing operation to mount the stopper sleeve to the nozzle body.

SUMMARY OF THE INVENTION

A hot runner system includes a manifold, a nozzle and a nozzle sealing assembly. The manifold defines a manifold melt channel and is configured to receive melt from a melt source. The nozzle includes a nozzle body and at least one nozzle tip, and defines a nozzle melt channel. The nozzle is coupled to the manifold such that the nozzle melt channel is in fluid communication with the manifold melt channel. The nozzle sealing assembly includes a cup-shaped nozzle seal cap and a sealing ring. The nozzle seal cap surrounds a tip portion of the nozzle body and includes at least one nozzle tip aperture. The sealing ring is coupled to an outer surface of the nozzle seal cap. The nozzle tip extends through the nozzle tip aperture and is coupled to the nozzle body.

An edge-gated hot runner nozzle includes a nozzle body, a plurality of nozzle tips and a sealing assembly. The nozzle body includes an upper head portion, a tip portion and a nozzle melt channel. The plurality of nozzle tips are coupled to the tip portion of the nozzle body. The sealing assembly includes a cup-shaped nozzle seal cap and a sealing ring. The nozzle seal cap surrounds and abuts the tip portion of the nozzle body and the cap includes a plurality of nozzle tip apertures. The sealing ring is coupled to an outer surface of the nozzle seal cap. Each of the plurality of nozzle tips extends through a respective nozzle tip aperture.

A hot runner system includes a manifold, an edge-gated nozzle and a nozzle sealing assembly. The manifold defines a manifold melt channel and is configured to receive melt from a melt source. The edge-gated nozzle includes a nozzle body and a plurality of nozzle tips and defines a nozzle melt channel. The nozzle is coupled to the manifold such that the nozzle melt channel is in fluid communication with the manifold melt channel. The nozzle sealing assembly includes a cup-shaped nozzle seal cap and a sealing ring. The nozzle seal cap surrounds a tip portion of the nozzle body and includes a plurality of nozzle tip apertures. The sealing ring is coupled to an outer surface of the nozzle seal cap. Each of the nozzle tips extends through a respective nozzle tip aperture and is threadably coupled to the nozzle body. The nozzle seal cap is also configured such that there is a gap between a portion of an inner surface of the nozzle seal cap and a portion of an outer surface of the nozzle body.

Other aspects and features of the present invention will become apparent to those of ordinary skill in the art upon review of the following figures and detailed description.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE DRAWINGS

Specific embodiments of the present invention are now described with reference to the figures, where like reference numbers in the figures and description indicate identical or functionally similar elements. Also in the figures, the left most digit of each reference number corresponds to the figure in which the reference number is used. While specific configurations and arrangements are discussed, it should be understood that this is done for illustrative purposes only. A person skilled in the relevant art will recognize that other configurations and arrangements can be used without departing from the spirit and scope of the invention.

Figure 1:
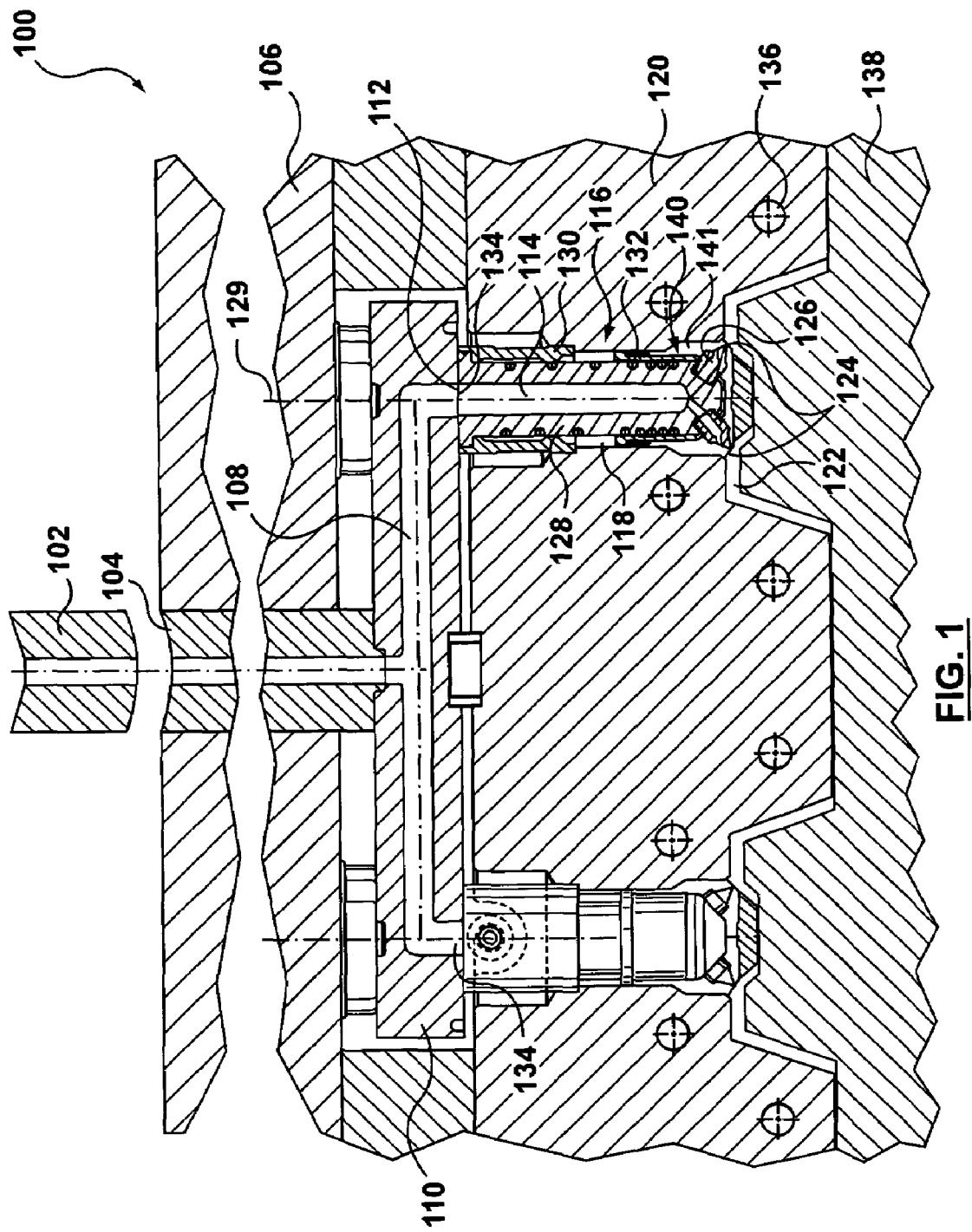
FIG. 1 is a cross-sectional view of an injection molding apparatus.

Referring first to FIG. 1, one example of an injection molding apparatus 100 with which the present invention may be utilized is shown. The injection molding apparatus includes a machine nozzle 102, which introduces a melt stream under pressure into the injection molding system via a sprue bushing 104 that is positioned within a machine platen 106. From sprue bushing 104, melt flows into a manifold melt channel 108 provided in a hot runner manifold 110. In injection molding apparatus 100, manifold 110 allows the melt stream to be distributed through manifold melt channel outlets 134 and into nozzle melt channels 114 provided in respective hot runner nozzles 116. Hot runner nozzles 116 are positioned within nozzle bores, or cavities, 118 of a mold plate 120, and each of hot runner nozzles 116 is aligned with mold gates 124 by an alignment collar 130 that is coupled to an upper head portion of the nozzle. A single nozzle sealing assembly 140 is utilized with each hot runner nozzle 116 to provide a seal between hot runner nozzle 116 and mold plate 120. The position of nozzle sealing assembly 140 creates a gap 141 between sealing assembly 140 and mold plate 120 that fills with melt during operation. As would be apparent to one of ordinary skill in the art, mold plate 120 may include one or more mold plates, and/or a mold cavity plate. A mold core plate 138 mates with mold plate 120 to form mold cavities 122. Each hot runner nozzle 116 is in fluid communication with multiple mold cavities 122 via mold gates 124 so that the melt stream may be injected through nozzle melt channel 114 and nozzle tips 126 and into mold cavities 122.

One of hot runner nozzles 116, included in FIG. 1, is shown in cross-section. Hot runner nozzle 116 has a nozzle melt channel inlet 112, at an upper end of nozzle melt channel 114, aligned with outlet 134 of manifold melt channel 108 to receive the melt stream and to deliver the melt through mold gates 124 to mold cavities 122. Hot runner nozzle 116 includes a nozzle body 128 and at least one nozzle tip 126. As shown, hot runner nozzle 116 is an edge-gated, or side-gated, nozzle including one or more nozzle tips 126 that extend at least partially radially outward from a longitudinal axis 129 of nozzle body 128. Injection molding apparatus 100 may include any number of such hot runner nozzles 116 located in respective nozzle bores 118 for transmitting melt from respective nozzle melt channel inlets 112 to respective mold gates 124. Injection molding apparatus 100 utilizes a heating element 132 in each nozzle and cooling channels 136 in the mold plate 120 to moderate the temperature of the melt.

Figure 2:
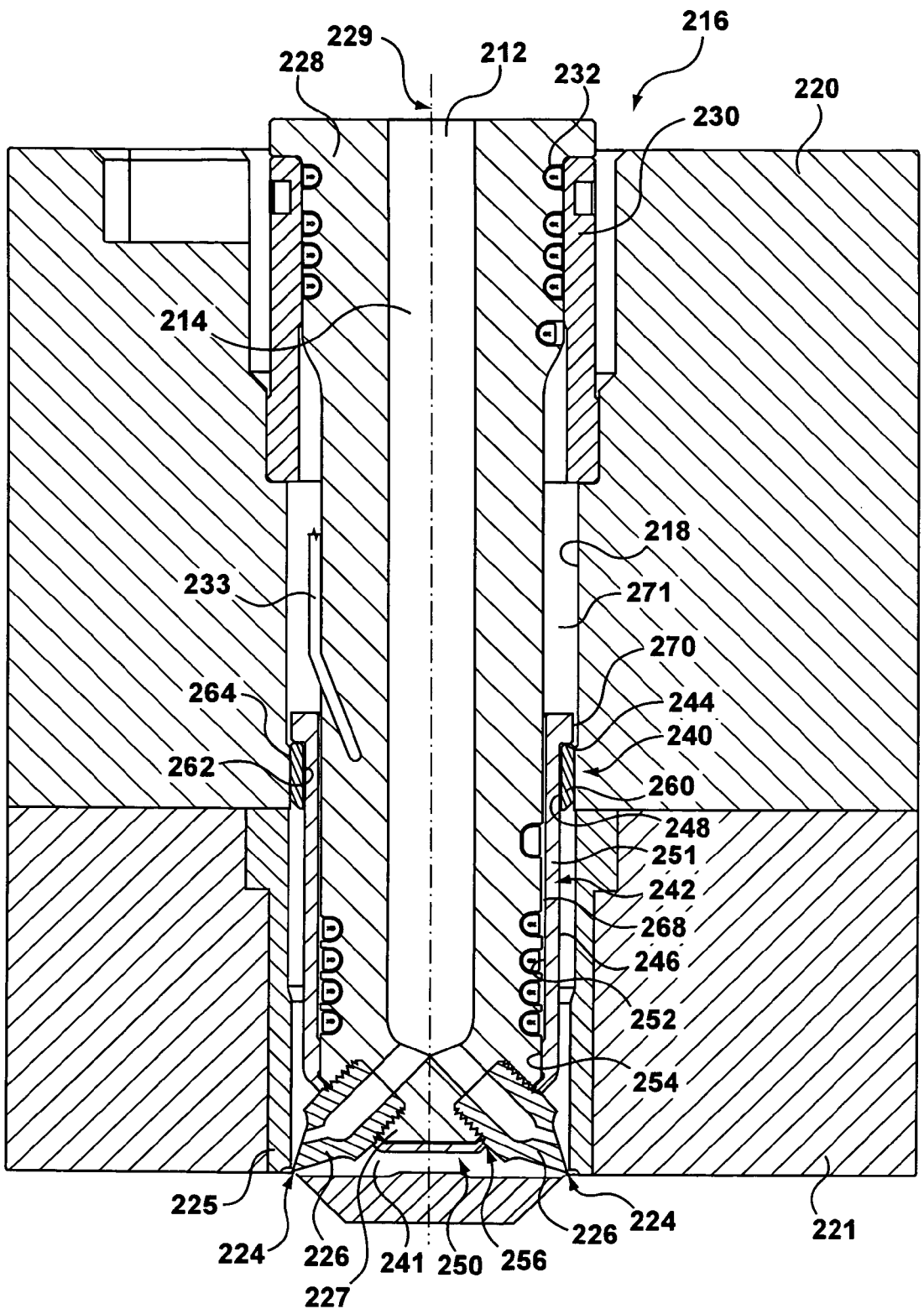
FIG. 2 is a cross-sectional view of a nozzle seal assembly according to an embodiment of the invention.

An embodiment of a hot runner nozzle 216 utilizing a nozzle seal assembly 240 is shown in FIG. 2. Nozzle 216 is located within a nozzle bore 218 that is formed in a mold plate assembly that includes a first mold plate 220 and a second mold plate 221. An alignment collar 230 positions nozzle 216 within mold bore 218 and aligns a plurality of nozzle tips 226 with a plurality of mold gates 224 that are formed by a mold plate insert 225.

Nozzle 216 generally includes a nozzle body 228 and a plurality of nozzle tips 226. Nozzle 216 is an edge-gated nozzle wherein nozzle tips 226 extend radially outward from a longitudinal axis 229 and downstream from a tip portion 227 of nozzle body 228 so that nozzle tips 226 are aligned with mold gates 224. Nozzle melt channel 214 delivers melt received through inlet 212 from a manifold melt channel (as shown in FIG. 1), through nozzle tip melt channels 223, and to mold gates 224. A heating element 232 and a thermocouple 233 are disposed about nozzle body 228 so that the temperature of the melt in nozzle 216 may be controlled. It shall be appreciated that heating element 232 may be any type of heating element known in the art, such as for example an embedded, helically-wound element as shown, a film heater or a sleeve heater. Further, it shall be appreciated that any temperature measuring device known in the art may be employed. In addition, the positions of the thermocouple and heater are shown as one example of possible locations. It shall be appreciated that the thermocouple and heater may be located anywhere on any of the components shown in order to provide thermal control necessary for any particular application.

Nozzle sealing assembly 240 is provided in order to seal nozzle 216 within bore 218 so that melt can not flow into a gap 271 formed between nozzle body 228 and first mold plate 220 upstream of nozzle sealing assembly 240. As described previously, it is often desired to create a gap between a nozzle and a mold plate adjacent to a mold gate. Accordingly, the configuration of nozzle sealing assembly 240 provides a gap 241 for the melt to flow adjacent to mold gates 224 while preventing the melt from flowing into gap 271. Nozzle sealing assembly 240 also creates a restricted heat transfer path from heated nozzle 216 to cooled mold plate 220 as will be described below in greater detail.

Nozzle sealing assembly 240 includes a nozzle seal cap 242 and a sealing ring 260. Nozzle seal cap 242 is generally a cylindrical cup-shaped cap that is configured to fit over a tip portion 227 of nozzle body 228. Nozzle seal cap 242 includes a base, or tip, portion 250 and a sidewall portion 251 that extends upward from base portion 250. The inner surface of base portion 250 is configured to compliment the outer surface of the tip portion 227 of nozzle body 228 so that base portion 250 contacts the tip portion 227 of nozzle body 228. Nozzle seal cap 242 is can be coupled to nozzle body 228 using a press fit, cold shrink fit, or brazing. Alternatively, nozzle seal cap 242 could be snugly fit over nozzle body 228 with nozzle tips 226 coupling nozzle seal cap 242 to nozzle body 228. In addition, nozzle tip apertures 256 are provided so that nozzle tips 226 may be mounted to nozzle body 228.

Sidewall portion 251 includes a nozzle contacting surface 254 on an inner surface 252 that is configured to contact the outer surface of nozzle body 228. A sealing ring mounting surface 248 is provided on an outer surface 246 of sidewall portion 251 and a shoulder 244 is provided adjacent to sealing ring mounting surface 248. The combination of mounting surface 248 and shoulder 244 locates sealing ring 260 on nozzle seal cap 242.

Sealing ring 260 is generally a cylindrical sleeve that is mounted to nozzle seal cap 242. An inner surface 262 of sealing ring 260 may be dimensioned to provide a desired fit with mounting surface 248 of nozzle seal cap 242. For example, sealing ring 260 may be designed to provide a sliding fit or a press fit with nozzle seal cap 242. An outer, or mold contacting, surface 264 of sealing ring 260 is dimensioned to provide sliding contact with the adjacent mold plate 220.

Nozzle seal assembly 240 is configured to reduce heat transfer from nozzle 216 to mold plate 220 and to route heat transfer away from mold gates 224. Heat transferring from nozzle 216 to mold plate 220 is limited to a complicated path that starts at the contact between nozzle seal cap 242 and nozzle body 228 at base portion 250 and nozzle contact surface 254. Heat that flows into nozzle seal cap 242 at those locations must then flow through sidewall portion 251. A gap 268 between the majority of sidewall portion 251 and nozzle body 228 is provided to reduce the heat transfer from nozzle body 228 to nozzle seal cap 242. Additionally, nozzle seal cap 242 does not touch any part of mold plate 220, mold plate 221 or mold plate insert 225 because it is spaced from those components by a gap 270, sealing ring 260 and gap 241, collectively. As a result, heat may flow only between nozzle seal cap 242 and mold plate 220 through sealing ring 260.

As previously noted, nozzle sealing mechanisms are designed to optimize the gap between the nozzle and the mold gate while restricting heat transfer from the nozzle to the mold plate. Nozzle sealing assembly 240 offers a nozzle sealing mechanism that is less costly, simpler to design and produce and capable of being employed with simple nozzle body designs.

In previous devices, the gap between the nozzle and the mold plate was defined by the configuration of the nozzle body and the size of the nozzle bore. Gap 241, between nozzle 216 and mold plates 220 and 221, is defined by nozzle sealing assembly 240 and nozzle bore 218. As a result, the size of gap 241 may be altered by altering the size of nozzle seal cap 242 and sealing ring 260 without altering nozzle body 228 unlike previous devices that required changes to both the nozzle body and sealing mechanism in order to alter the gap. For example, in nozzle sealing assembly 240, the distance between shoulder 244 and base portion 250 may be chosen to create a gap 241 having a desired length, and the outer dimension of nozzle seal cap 242 may be chosen so that gap 241 has a desired width. Either or both of those features may be changed without requiring any changes to nozzle body 228.

Similarly, the location of the heat transfer path through the seal mechanism in previous devices was often determined by a feature on the nozzle body, such as a shoulder, or carefully locating and affixing the sealing mechanism to the nozzle body. In addition, the length of the heat transfer path through previous sealing mechanisms was also relatively short due to their design. In fact, in some devices a direct heat transfer path extended radially outward from the nozzle body to the mold plate. The location and length of the heat transfer path through nozzle sealing assembly 240 may be controlled by altering the configuration of nozzle seal cap 242. For example, the distance between nozzle contact surface 254 of nozzle seal cap 242 and mold contacting surface 264 of sealing ring 260 may be easily increased by increasing the length of sidewall portion 251 of nozzle seal cap 242.

Furthermore, no additional manufacturing processes such as press fitting or brazing are required to locate nozzle sealing assembly 240 on the nozzle because the configuration of nozzle seal cap allows it to be accurately located on nozzle bodies having a standard shape. In addition, because nozzle tips 226 extend through nozzle tip apertures 256 and are mounted to nozzle body 228, nozzle tips 226 may sufficiently retain nozzle seal cap 242 on nozzle body 228.

Nozzle seal cap 242 and sealing ring 260 may be made of any material known in the art. For example, nozzle seal cap 242 and/or sealing ring 260 may be constructed from steel, such as tool steel, and they may be constructed from the same material as mold plate 220 or nozzle body 228. Alternatively, nozzle seal cap 242 and/or sealing ring 260 may be constructed from a material, such as titanium or ceramic, that is less thermally conductive than the material of the nozzle body and/or mold plate 220 to further reduce heat transfer. If heat loss is not a factor, nozzle seal cap 242 and/or sealing ring 260 may also be made of material that is more conductive than the material of the nozzle body and/or mold plate such as copper, copper alloys, aluminum or aluminum alloys.

Figure 3:
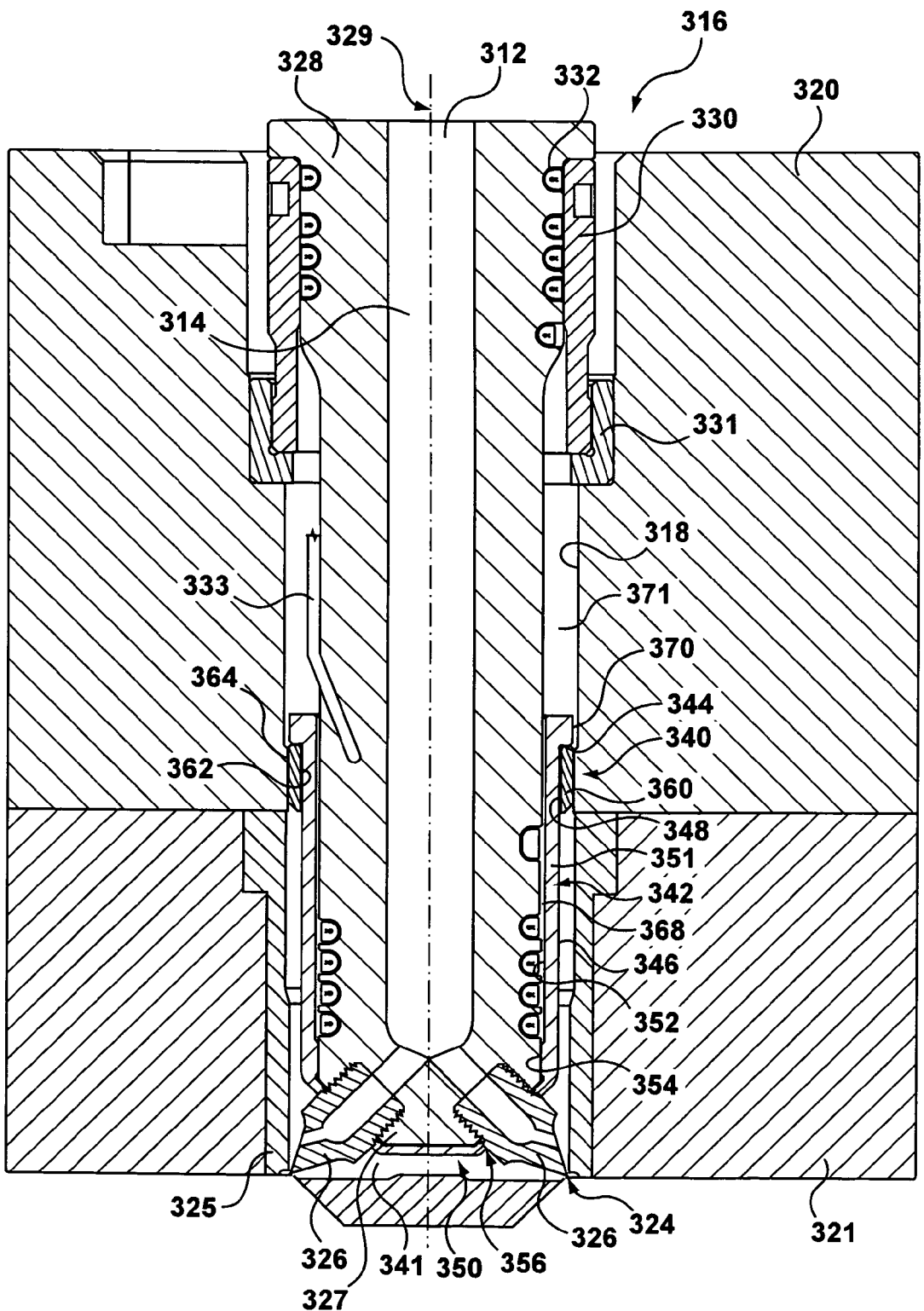
FIG. 3 is a cross-sectional view of a nozzle seal assembly according to another embodiment of the invention.

Another embodiment of a hot runner nozzle 316 is shown in FIG. 3. The elements in FIG. 3 bearing reference numbers like those in FIG. 2 are identical or functionally similar to the elements described above in relation to hot runner nozzle 216 and may not be described further. Similar to hot runner nozzle 216, described above, hot runner nozzle 316 includes a nozzle melt channel 314 with an inlet 312, and is located within a nozzle bore 318 that is formed in a mold plate assembly that includes a first mold plate 320 and a second mold plate 321. Nozzle 316 generally includes a nozzle body 328, a plurality of nozzle tips 326 extending radially outward from longitudinal axis 329, a heating element 332 and a thermocouple 333.

A nozzle sealing assembly 340 seals nozzle 316 within bore 318, as described above with respect to FIG. 2. Nozzle sealing assembly 340 includes a generally cylindrical cup-shaped nozzle seal cap 342 that is configured to fit over a tip portion 327 of nozzle body 328 and a sealing ring 360 that is configured to fit onto nozzle seal cap 342. The configuration of nozzle sealing assembly 340 provides a gap 341 for the melt to flow adjacent to mold gates 324, prevents the melt from flowing into a gap 371 upstream of nozzle sealing assembly 340 and restricts heat transfer from heated nozzle 316 to cooled mold plate 320.

Nozzle seal cap 342 includes a base portion 350 and a sidewall portion 351 that extends upward from base portion 350. The inner surface of base portion 350 is configured to compliment the outer surface of the tip portion 327 of nozzle body 328 so that base portion 350 contacts the tip portion 327 of nozzle body 328. In addition, nozzle tip apertures 356 are provided so that nozzle tips 326 may be mounted to nozzle body 328.

Sidewall portion 351 includes a nozzle contacting surface 354 on an inner surface 352 that is configured to contact the outer surface of nozzle body 328. A sealing ring mounting surface 348 is provided on an outer surface 346 of sidewall portion 351 and a shoulder 344 is provided adjacent to sealing ring mounting surface 348. The combination of mounting surface 348 and shoulder 344 locates sealing ring 360 on nozzle seal cap 342.

Sealing ring 360 is generally a cylindrical sleeve that is mounted to nozzle seal cap 342. An inner surface 362 of sealing ring 360 may be dimensioned to provide a desired fit with mounting surface 348 of nozzle seal cap 342. For example, sealing ring 360 may be designed to provide a sliding fit or a press fit with nozzle seal cap 342. An outer, or mold contacting, surface 364 of sealing ring 360 is dimensioned to provide sliding contact with the adjacent mold plate 320.

Nozzle seal assembly 340 is configured to reduce heat transfer from nozzle 316 to mold plate 320 and routes transferred heat away from mold gates 324. The heat transfer path through nozzle seal assembly is similar to the heat transfer path through nozzle seal assembly 240. Heat is able to pass from nozzle body 328 to nozzle seal cap 342 at base portion 350 and at a nozzle contact surface 354. Heat that flows into nozzle seal cap 342 may then flow through sidewall portion 351. A gap 368 between the majority of sidewall portion 351 and nozzle body 328 is provided to reduce the heat transfer from nozzle body 328 to nozzle seal cap 342. Additionally, nozzle seal cap 342 does not touch any part of mold plate 320, mold plate 321 or mold plate insert 325 because it is spaced from those components by a gap 370, sealing ring 360 and gap 341, collectively. As a result, heat may flow only between nozzle seal cap 342 and mold plate 320 through sealing ring 360.

In order to further reduce heat transfer between nozzle 316 and mold plate 320, an alignment collar bushing 331 is provided in combination with an alignment collar 330. The combined alignment collar bushing 331 and alignment collar 330 positions nozzle 316 within mold bore 318 and aligns the nozzle tips 326 with the mold gates 324 that are formed by mold plate insert 325. The heat transferring between the upper portion of nozzle body 328 and mold plate 320 in nozzle 316 is required to pass through alignment collar 330, past the interface between alignment collar 330 and alignment collar bushing 331, and then through alignment collar bushing 331 prior to reaching mold plate 320.

Alignment collar bushing 331 may be constructed from any material known in the art. For example, it may be constructed from steel or materials less thermally conductive than steel such as titanium or ceramic.

Figure 4:
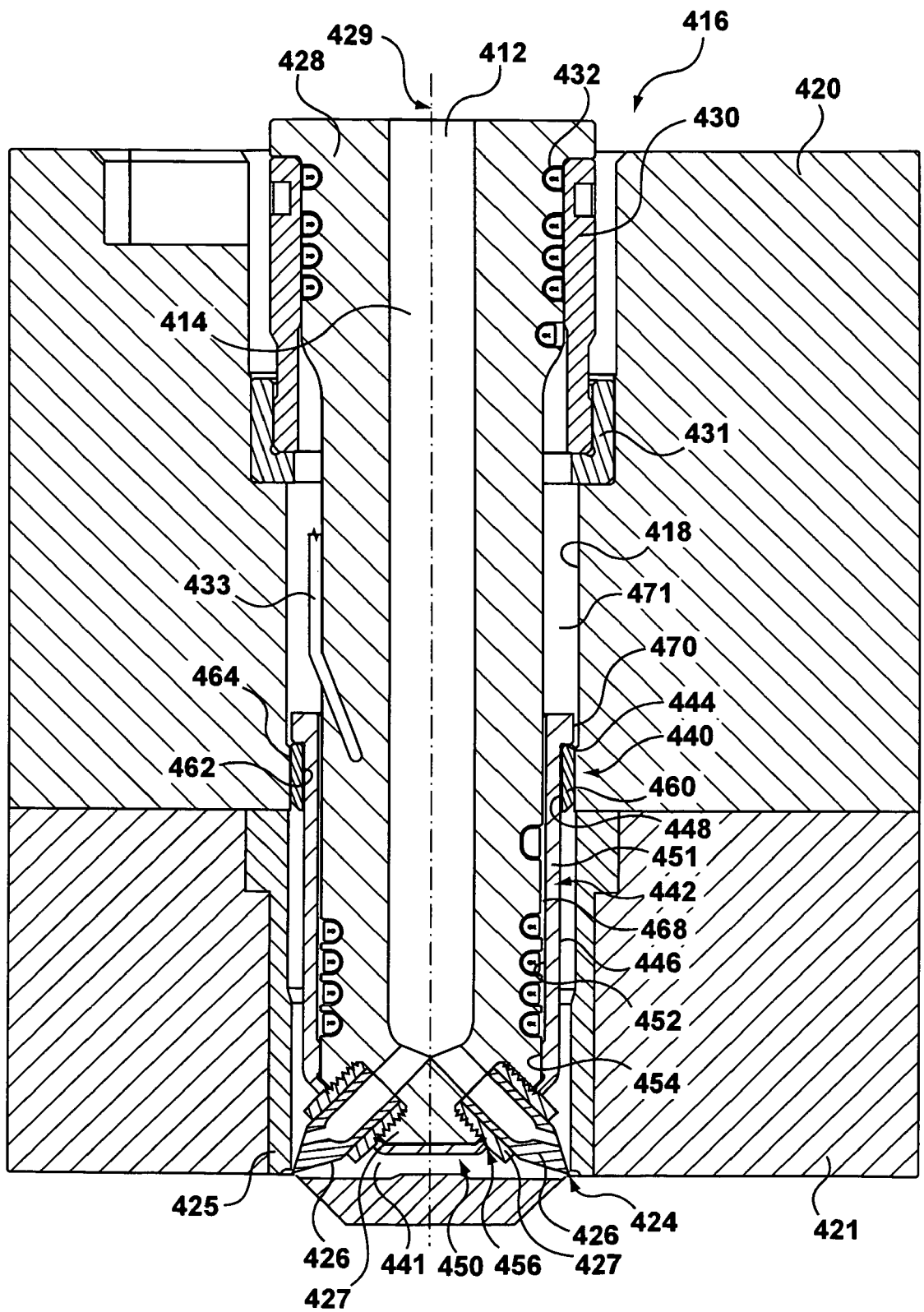
FIG. 4 is a cross-sectional view of a nozzle seal assembly according to another embodiment of the invention.

FIGS. 4-7 illustrate various modifications to hot runner nozzle 316 and nozzle seal assembly 340. In FIG. 4, nozzle tip retainers 480 have been added to retain a plurality of nozzle tips 426 on nozzle body 428. In all other respects, FIG. 4 is similar to FIG. 3. Thus, hot runner nozzle 416 includes a nozzle melt channel 414 with an inlet 412, and is located within a nozzle bore 418 that is formed in a mold plate assembly that includes a first mold plate 420 and a second mold plate 421. Nozzle 416 generally includes a nozzle body 428, a plurality of nozzle tips 426 extending radially outward from longitudinal axis 429, a heating element 432 and a thermocouple 433.

Nozzle sealing assembly 440 seals nozzle 416 within bore 418, as described above with respect to FIGS. 2 and 3. Nozzle sealing assembly 440 includes a generally cylindrical cup-shaped nozzle seal cap 442 that is configured to fit over a tip portion 427 of nozzle body 428 and a sealing ring 460 that is configured to fit onto nozzle seal cap 442. The configuration of nozzle sealing assembly 440 provides a gap 441 for the melt to flow adjacent to mold gates 424, prevents the melt from flowing into a gap 471 upstream of nozzle sealing assembly 440 and restricts heat transfer from heated nozzle 416 to cooled mold plate 420.

Nozzle seal cap 442 includes a base portion 450 and a sidewall portion 451 that extends upward from base portion 450. The inner surface of base portion 450 is configured to compliment the outer surface of the tip portion 427 of nozzle body 428 so that base portion 450 contacts the tip portion 427 of nozzle body 428. In addition, nozzle tip apertures 456 are provided so that nozzle tips 426 may be mounted to nozzle body 428.

Sidewall portion 451 includes a nozzle contacting surface 454 on an inner surface 452 that is configured to contact the outer surface of nozzle body 428. A sealing ring mounting surface 448 is provided on an outer surface 446 of sidewall portion 451 and a shoulder 444 is provided adjacent to sealing ring mounting surface 448. The combination of mounting surface 448 and shoulder 444 locates sealing ring 460 on nozzle seal cap 442.

Sealing ring 460 is generally a cylindrical sleeve that is mounted to nozzle seal cap 442. An inner surface 462 of sealing ring 460 may be dimensioned to provide a desired fit with mounting surface 448 of nozzle seal cap 442. An outer, or mold contacting, surface 464 of sealing ring 460 is dimensioned to provide sliding contact with the adjacent mold plate 420.

Nozzle seal assembly 440 is configured to reduce heat transfer from nozzle 416 to mold plate 420 and routes transferred heat away from mold gates 424. Heat is able to pass from nozzle body 428 to nozzle seal cap 442 at base portion 450 and at a nozzle contact surface 454. Heat that flows into nozzle seal cap 442 may then flow through sidewall portion 451. A gap 468 between the majority of sidewall portion 451 and nozzle body 428 is provided to reduce the heat transfer from nozzle body 428 to nozzle seal cap 442. Additionally, nozzle seal cap 442 does not touch any part of mold plate 420, mold plate 421 or mold plate insert 425 because it is spaced from those components by a gap 470, sealing ring 460 and gap 441, collectively. As a result, heat may flow only between nozzle seal cap 442 and mold plate 420 through sealing ring 460.

The embodiment shown in FIG. 4 also includes alignment collar bushing 431 in combination with alignment collar 430, as described above with respect to FIG. 3. However, it should be understood that nozzle tip retainers 480 can be used in any embodiment described herein, with or without alignment collar bushing 431.

Figure 5:
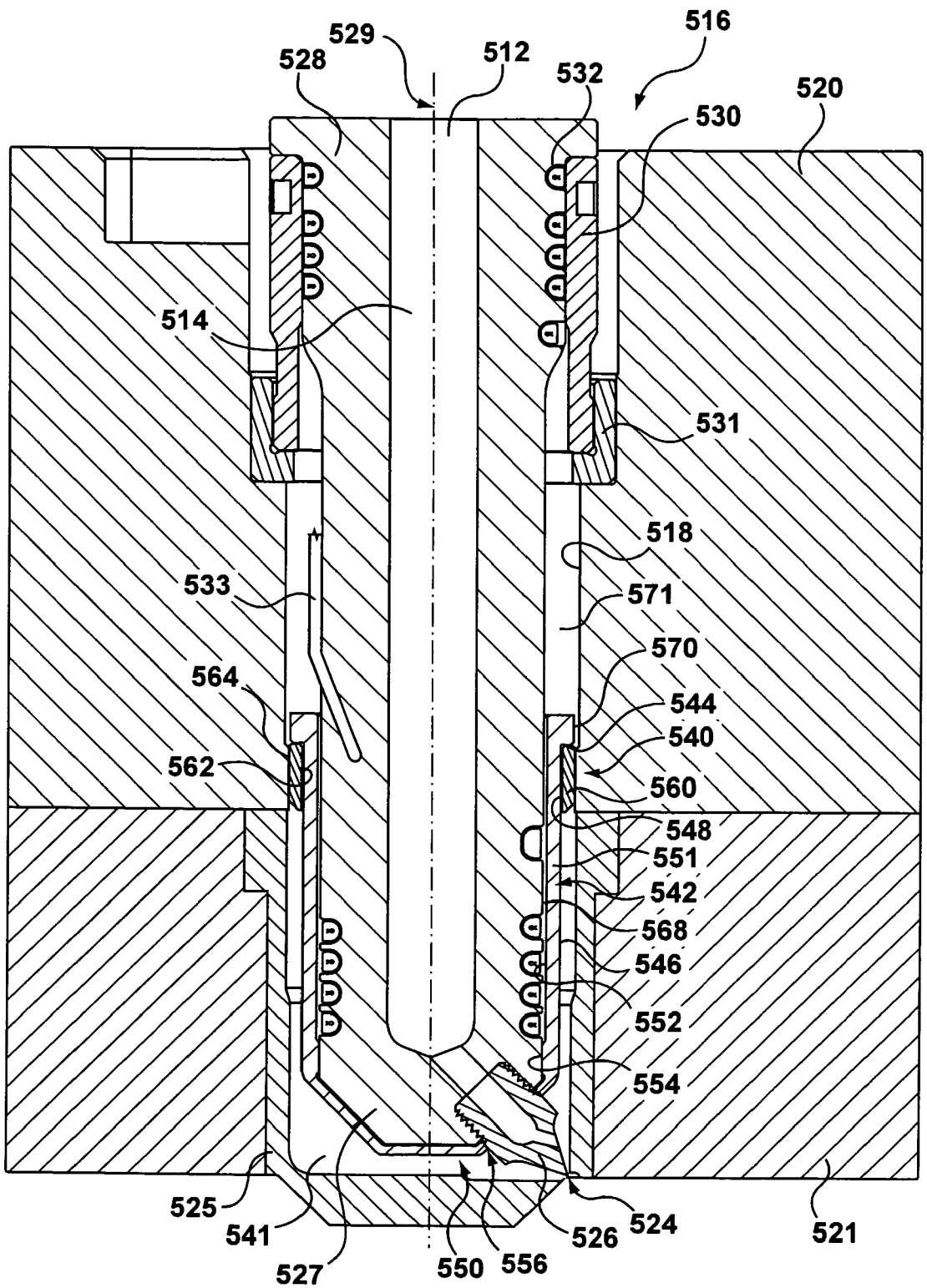
FIG. 5 is a cross-sectional view of a nozzle seal assembly according to another embodiment of the invention.

FIG. 5 illustrates a hot runner nozzle 516 that includes a single nozzle tip 526 rather than a plurality of nozzle tips as the previous embodiments. In all other respects, it is similar to the nozzle 316 shown in FIG. 3. However, the single nozzle tip embodiment of FIG. 5 is not limited to the embodiment shown in FIG. 3, as a single nozzle tip can be used in conjunction with any of the embodiments disclosed herein.

Referring to FIG. 5, hot runner nozzle 516 includes a nozzle melt channel 514 with an inlet 512, and is located within a nozzle bore 518 that is formed in a mold plate assembly that includes a first mold plate 520 and a second mold plate 521. Nozzle 416 generally includes a nozzle body 528, a single nozzle tip 526 extending radially outward from a longitudinal axis 529, a heating element 532 and a thermocouple 533.

Nozzle sealing assembly 540 seals nozzle 516 within bore 518, as described above with respect to FIGS. 2 and 3. Nozzle sealing assembly 540 includes a generally cylindrical cup-shaped nozzle seal cap 542 that is configured to fit over a tip portion 527 of nozzle body 528 and a sealing ring 560 that is configured to fit onto nozzle seal cap 542. The configuration of nozzle sealing assembly 540 provides a gap 441 for the melt to flow adjacent to mold gate 524, prevents the melt from flowing into a gap 571 upstream of nozzle sealing assembly 540 and restricts heat transfer from heated nozzle 516 to cooled mold plate 520.

Nozzle seal cap 542 includes a base portion 550 and a sidewall portion 551 that extends upward from base portion 550. The inner surface of base portion 550 is configured to compliment the outer surface of the tip portion 527 of nozzle body 528 so that base portion 550 contacts the tip portion 527 of nozzle body 528. In addition, a nozzle tip aperture 556 is provided so that nozzle tip 526 may be mounted to nozzle body 528.

Sidewall portion 551 includes a nozzle contacting surface 554 on an inner surface 552 that is configured to contact the outer surface of nozzle body 528. A sealing ring mounting surface 548 is provided on an outer surface 546 of sidewall portion 551 and a shoulder 544 is provided adjacent to sealing ring mounting surface 548. The combination of mounting surface 548 and shoulder 544 locates sealing ring 560 on nozzle seal cap 542.

Sealing ring 560 is generally a cylindrical sleeve that is mounted to nozzle seal cap 542. An inner surface 562 of sealing ring 560 may be dimensioned to provide a desired fit with mounting surface 548 of nozzle seal cap 542. An outer, or mold contacting, surface 564 of sealing ring 560 is dimensioned to provide sliding contact with the adjacent mold plate 520.

Nozzle seal assembly 540 is configured to reduce heat transfer from nozzle 516 to mold plate 520 and routes transferred heat away from mold gates 524. Heat is able to pass from nozzle body 528 to nozzle seal cap 542 at base portion 550 and at a nozzle contact surface 554. Heat that flows into nozzle seal cap 542 may then flow through sidewall portion 551. A gap 568 between the majority of sidewall portion 551 and nozzle body 528 is provided to reduce the heat transfer from nozzle body 528 to nozzle seal cap 542. Additionally, nozzle seal cap 542 does not touch any part of mold plate 520, mold plate 521 or mold plate insert 525 because it is spaced from those components by a gap 570, sealing ring 560 and gap 541, collectively. As a result, heat may flow only between nozzle seal cap 542 and mold plate 520 through sealing ring 560.

The embodiment shown in FIG. 5 also includes alignment collar bushing 531 in combination with alignment collar 530, as described above with respect to FIG. 3. However, it should be understood that a single nozzle tip 526 can be used in any embodiment described herein, with or without alignment collar bushing 531.

Figure 6:
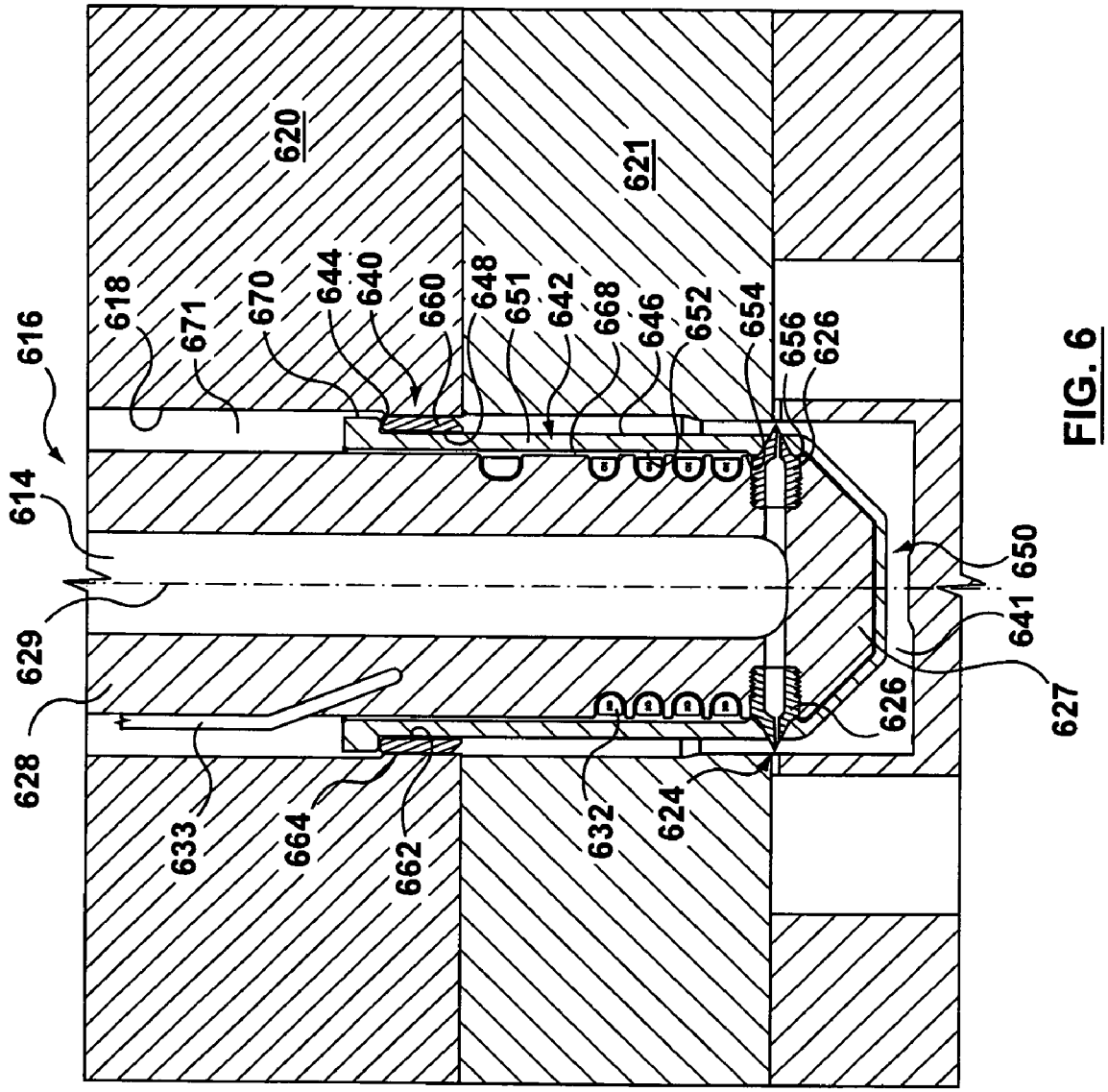
FIG. 6 is a cross-sectional view of a nozzle seal assembly according to another embodiment of the invention.

In FIG. 6, a plurality of mold gates 624 are formed in mold plate 621 and the mold plate insert included in previous embodiments has been removed. Further, FIG. 6 shows nozzle tips 626 disposed at substantially a right angle to longitudinal axis 629. In all other aspects, FIG. 6 is similar to FIG. 3. However, it should be understood that the mold pate insert may be removed from any of the embodiments disclosed herein by forming the mold gates in the mold plate. Further, the nozzle tips of the various embodiments may extend radially outwardly from longitudinal axis 629 at any angle in the various embodiments shown.

Referring to FIG. 6, hot runner nozzle 616 includes a nozzle melt channel 614 and is located within a nozzle bore 618 that is formed in a mold plate assembly that includes a first mold plate 620 and a second mold plate 621. Nozzle 616 generally includes a nozzle body 628, a plurality of nozzle tips 626 extending radially outward from and at substantially a right angle relative to longitudinal axis 629, a heating element 632 and a thermocouple 633.

Nozzle sealing assembly 640 seals nozzle 616 within bore 618, as described above with respect to FIGS. 2 and 3. Nozzle sealing assembly 640 includes a generally cylindrical cup-shaped nozzle seal cap 642 that is configured to fit over a tip portion 627 of nozzle body 628 and a sealing ring 660 that is configured to fit onto nozzle seal cap 642. The configuration of nozzle sealing assembly 640 provides a gap 641 for the melt to flow adjacent to mold gates 624, prevents the melt from flowing into a gap 671 upstream of nozzle sealing assembly 640 and restricts heat transfer from heated nozzle 616 to cooled mold plate 620.

Nozzle seal cap 642 includes a base portion 650 and a sidewall portion 651 that extends upward from base portion 650. The inner surface of base portion 650 is configured to compliment the outer surface of the tip portion 627 of nozzle body 628 so that base portion 650 contacts the tip portion 627 of nozzle body 628. In addition, nozzle tip apertures 656 are provided so that nozzle tips 626 may be mounted to nozzle body 628. Sidewall portion 651 includes a nozzle contacting surface 654 on an inner surface 652 that is configured to contact the outer surface of nozzle body 628. A sealing ring mounting surface 648 is provided on an outer surface 646 of sidewall portion 651 and a shoulder 644 is provided adjacent to sealing ring mounting surface 648. The combination of mounting surface 648 and shoulder 644 locates sealing ring 660 on nozzle seal cap 642.

Sealing ring 660 is generally a cylindrical sleeve that is mounted to nozzle seal cap 642. An inner surface 662 of sealing ring 660 may be dimensioned to provide a desired fit with mounting surface 648 of nozzle seal cap 642. An outer, or mold contacting, surface 664 of sealing ring 660 is dimensioned to provide sliding contact with the adjacent mold plate 620.

Nozzle seal assembly 640 is configured to reduce heat transfer from nozzle 616 to mold plate 620 and routes transferred heat away from mold gates 624. Heat is able to pass from nozzle body 628 to nozzle seal cap 642 at base portion 650 and at a nozzle contact surface 654. Heat that flows into nozzle seal cap 642 may then flow through sidewall portion 651. A gap 668 between the majority of sidewall portion 651 and nozzle body 628 is provided to reduce the heat transfer from nozzle body 628 to nozzle seal cap 642. Additionally, nozzle seal cap 642 does not touch any part of mold plate 620 or mold plate 621 because it is spaced from those components by a gap 670, sealing ring 660 and gap 641, collectively. As a result, heat may flow only between nozzle seal cap 642 and mold plate 620 through sealing ring 660.

The embodiment shown in FIG. 6 shows only a lower portion of the nozzle 616. The upper portion of the nozzle 616 may be configured like any of the other embodiments described herein or any other configuration as would be known by those skilled in the art.

Figure 7:
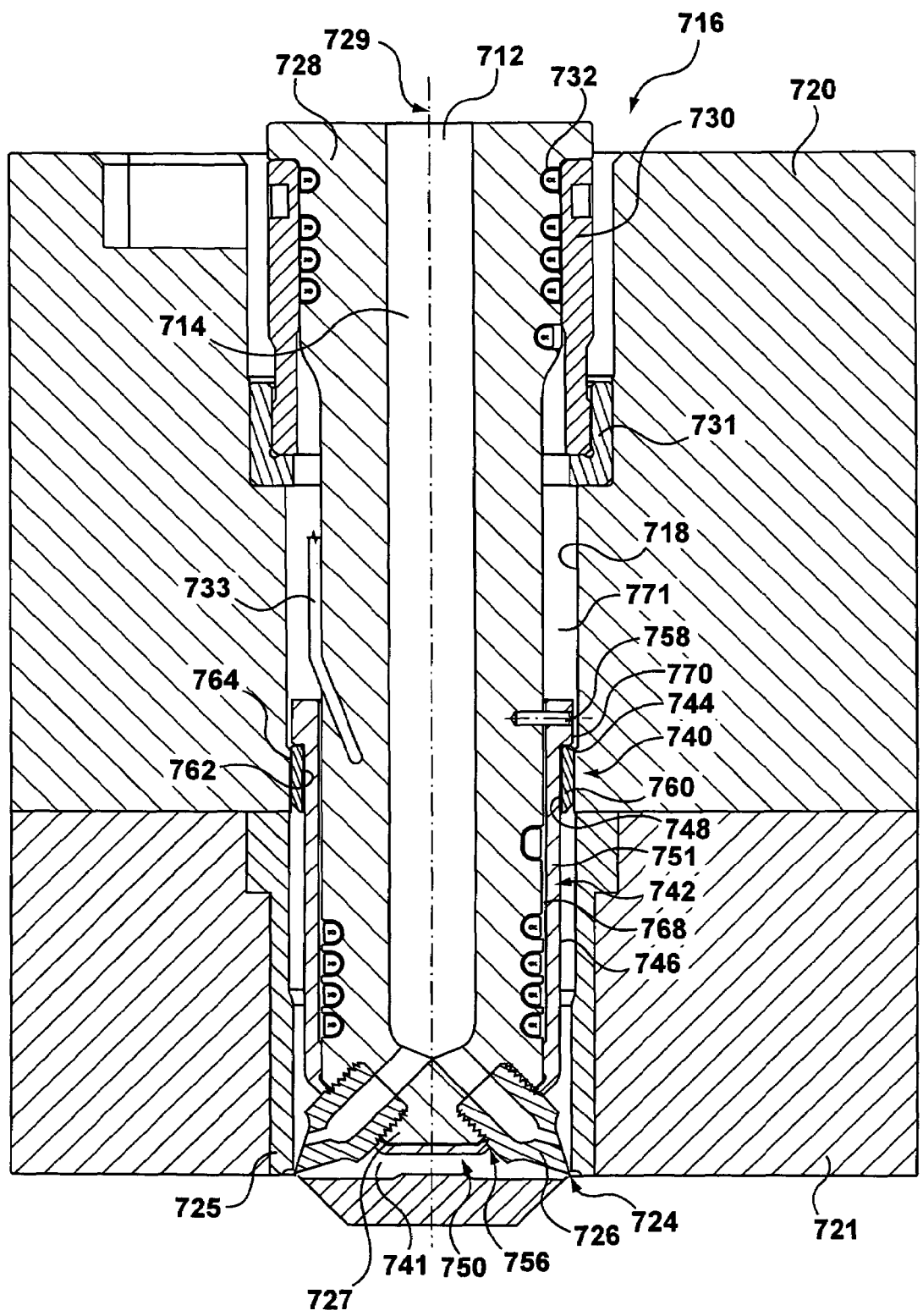
FIG. 7 is a cross-sectional view of a nozzle seal assembly according to another embodiment of the invention.

FIG. 7 shows a cap mounting pin 758 that may be used to locate nozzle seal cap 742 on nozzle body 728. Gap 768 between nozzle seal cap 742 and nozzle body 728 may therefore extend the full length of sidewall portion 751 of nozzle seal cap 742. In other aspects, the embodiment shown in FIG. 7 is similar to the embodiment shown in FIG. 3. However, it should be understood that cap mounting pin 758 can be used in conjunction with any of the embodiments described herein.

Referring to FIG. 7, hot runner nozzle 716 includes a nozzle melt channel 714 with an inlet 712, and is located within a nozzle bore 718 that is formed in a mold plate assembly that includes a first mold plate 720 and a second mold plate 721. Nozzle 716 generally includes a nozzle body 728, a plurality of nozzle tips 726 extending radially outward from longitudinal axis 729, a heating element 732 and a thermocouple 733.

Nozzle sealing assembly 740 seals nozzle 716 within bore 718, as described above with respect to FIGS. 2 and 3. Nozzle sealing assembly 740 includes a generally cylindrical cup-shaped nozzle seal cap 742 that is configured to fit over a tip portion 727 of nozzle body 728 and a sealing ring 760 that is configured to fit onto nozzle seal cap 742. The configuration of nozzle sealing assembly 740 provides a gap 741 for the melt to flow adjacent to mold gates 724, prevents the melt from flowing into a gap 771 upstream of nozzle sealing assembly 740 and restricts heat transfer from heated nozzle 716 to cooled mold plate 720.

Nozzle seal cap 742 includes a base portion 750 and a sidewall portion 751 that extends upward from base portion 750. The inner surface of base portion 750 is configured to compliment the outer surface of the tip portion 727 of nozzle body 728 so that base portion 750 contacts the tip portion 727 of nozzle body 728. In addition, nozzle tip apertures 756 are provided so that nozzle tips 726 may be mounted to nozzle body 728. A sealing ring mounting surface 748 is provided on an outer surface 746 of sidewall portion 751 and a shoulder 744 is provided adjacent to sealing ring mounting surface 748. The combination of mounting surface 748 and shoulder 744 locates sealing ring 760 on nozzle seal cap 742.

Sealing ring 760 is generally a cylindrical sleeve that is mounted to nozzle seal cap 742. An inner surface 762 of sealing ring 760 may be dimensioned to provide a desired fit with mounting surface 748 of nozzle seal cap 742. An outer, or mold contacting, surface 764 of sealing ring 760 is dimensioned to provide sliding contact with the adjacent mold plate 720.

Nozzle seal assembly 740 is configured to reduce heat transfer from nozzle 716 to mold plate 720 and routes transferred heat away from mold gates 724. Heat is able to pass from nozzle body 728 to nozzle seal cap 742 at base portion 750. Heat that flows into nozzle seal cap 742 may then flow through sidewall portion 751. Gap 768 between the sidewall portion 751 and nozzle body 728 is provided to reduce the heat transfer from nozzle body 728 to nozzle seal cap 742. Additionally, nozzle seal cap 742 does not touch any part of mold plate 720, mold plate 721 or mold plate insert 725 because it is spaced from those components by a gap 770, sealing ring 760 and gap 741, collectively. As a result, heat may flow only between nozzle seal cap 742 and mold plate 720 through sealing ring 760.

The embodiment shown in FIG. 7 also includes alignment collar bushing 731 in combination with alignment collar 730, as described above with respect to FIG. 3. However, it should be understood that cap mounting pin 758 may be used with any embodiment described herein, with or without alignment collar bushing 731.

Figures 8A, 8B:
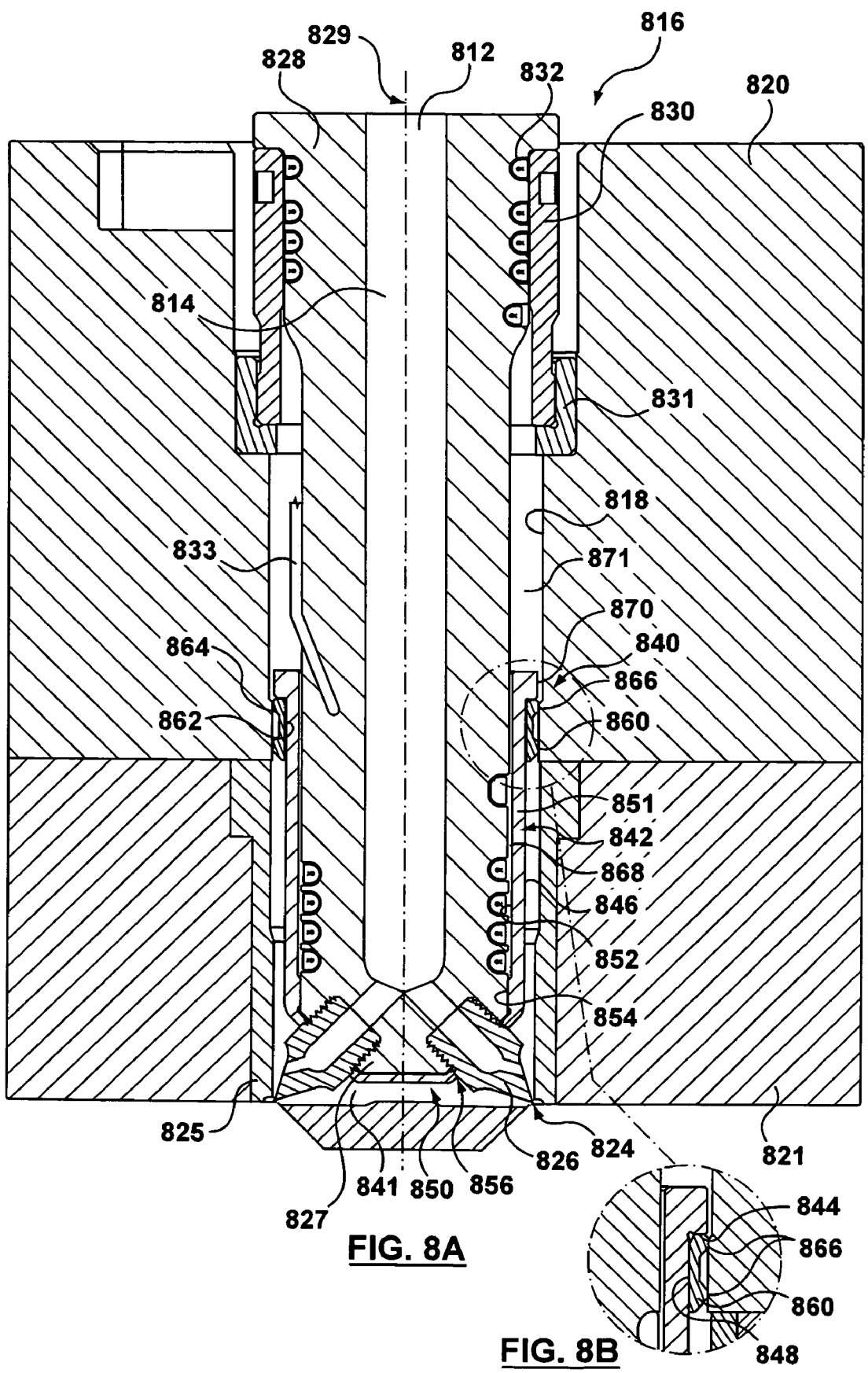
FIG. 8A is a cross-sectional view of a nozzle seal assembly according to another embodiment of the invention and FIG. 8B shows an enlarged portion of the embodiment of FIG. 8A.

FIG. 8A shows a hot runner nozzle 816 that is identical to the one shown in FIG. 3 except for a sealing ring 860 that is configured to further reduce heat transfer from a nozzle 816 to a mold plate 820 through a nozzle sealing assembly 840. Except for sealing ring 860, the embodiment shown in FIGS. 8A and 8B is identical to the embodiment shown in FIG. 3.

Thus, hot runner nozzle 816 includes a nozzle melt channel 814 with an inlet 812, and is located within a nozzle bore 818 that is formed in a mold plate assembly that includes a first mold plate 820 and a second mold plate 821. Nozzle 816 generally includes a nozzle body 828, a plurality of nozzle tips 826 extending radially outward from longitudinal axis 829, a heating element 832 and a thermocouple 833.

Nozzle sealing assembly 840 seals nozzle 816 within bore 818, as described above with respect to FIGS. 2 and 3. Nozzle sealing assembly 840 includes a generally cylindrical cup-shaped nozzle seal cap 842 that is configured to fit over a tip portion 827 of nozzle body 828 and sealing ring 860 that is configured to fit onto nozzle seal cap 842. The configuration of nozzle sealing assembly 840 provides a gap 841 for the melt to flow adjacent to mold gates 824, prevents the melt from flowing into a gap 871 upstream of nozzle sealing assembly 840 and restricts heat transfer from heated nozzle 816 to cooled mold plate 820.

Nozzle seal cap 842 includes a base portion 850 and a sidewall portion 851 that extends upward from base portion 850. The inner surface of base portion 850 is configured to compliment the outer surface of the tip portion 827 of nozzle body 828 so that base portion 850 contacts the tip portion 827 of nozzle body 828. In addition, nozzle tip apertures 856 are provided so that nozzle tips 826 may be mounted to nozzle body 828. Sidewall portion 851 includes a nozzle contacting surface 854 on an inner surface 852 that is configured to contact the outer surface of nozzle body 828. A sealing ring mounting surface 848 is provided on an outer surface 846 of sidewall portion 851 and a shoulder 844 is provided adjacent to sealing ring mounting surface 848. The combination of mounting surface 848 and shoulder 844 locates sealing ring 860 on nozzle seal cap 842.

Sealing ring 860 is generally a cylindrical sleeve that includes an inner surface 862, and an outer surface 864. Inner surface 862 fits onto a mounting surface 848 of nozzle seal cap 842 and sealing ring 860 may be designed to provide a sliding fit or a press fit with nozzle seal cap 842. Outer, or mold contacting, surface 864 of sealing ring 860 is dimensioned to provide sliding contact with the adjacent mold plate 820.

Nozzle seal assembly 840 is configured to reduce heat transfer from nozzle 816 to mold plate 820 and routes transferred heat away from mold gates 824. Heat is able to pass from nozzle body 828 to nozzle seal cap 842 at base portion 850. Heat that flows into nozzle seal cap 842 may then flow through sidewall portion 851. Gap 868 between the sidewall portion 851 and nozzle body 828 is provided to reduce the heat transfer from nozzle body 828 to nozzle seal cap 842. Additionally, nozzle seal cap 842 does not touch any part of mold plate 820, mold plate 821 or mold plate insert 825 because it is spaced from those components by a gap 870, sealing ring 860 and gap 841, collectively. As a result, heat may flow only between nozzle seal cap 842 and mold plate 820 through sealing ring 860.

Sealing ring 860 is configured to further reduce heat transfer through nozzle sealing assembly 840 by including a mold contacting surface 864 that is configured to have less contacting surface area than the previously described embodiments. The reduction in contacting surface area is created by thermal ribs 866 on outer surface 864. It shall be appreciated that the features on outer surface 864 may be any shape that provides a reduced contact surface area while maintaining a fluid seal between sealing ring 860 and mold plate 820.

The embodiment shown in FIG. 8 also includes alignment collar bushing 831 in combination with alignment collar 830, as described above with respect to FIG. 3. However, it should be understood that sealing ring 860 may be used with any embodiment described herein.

Figure 9:
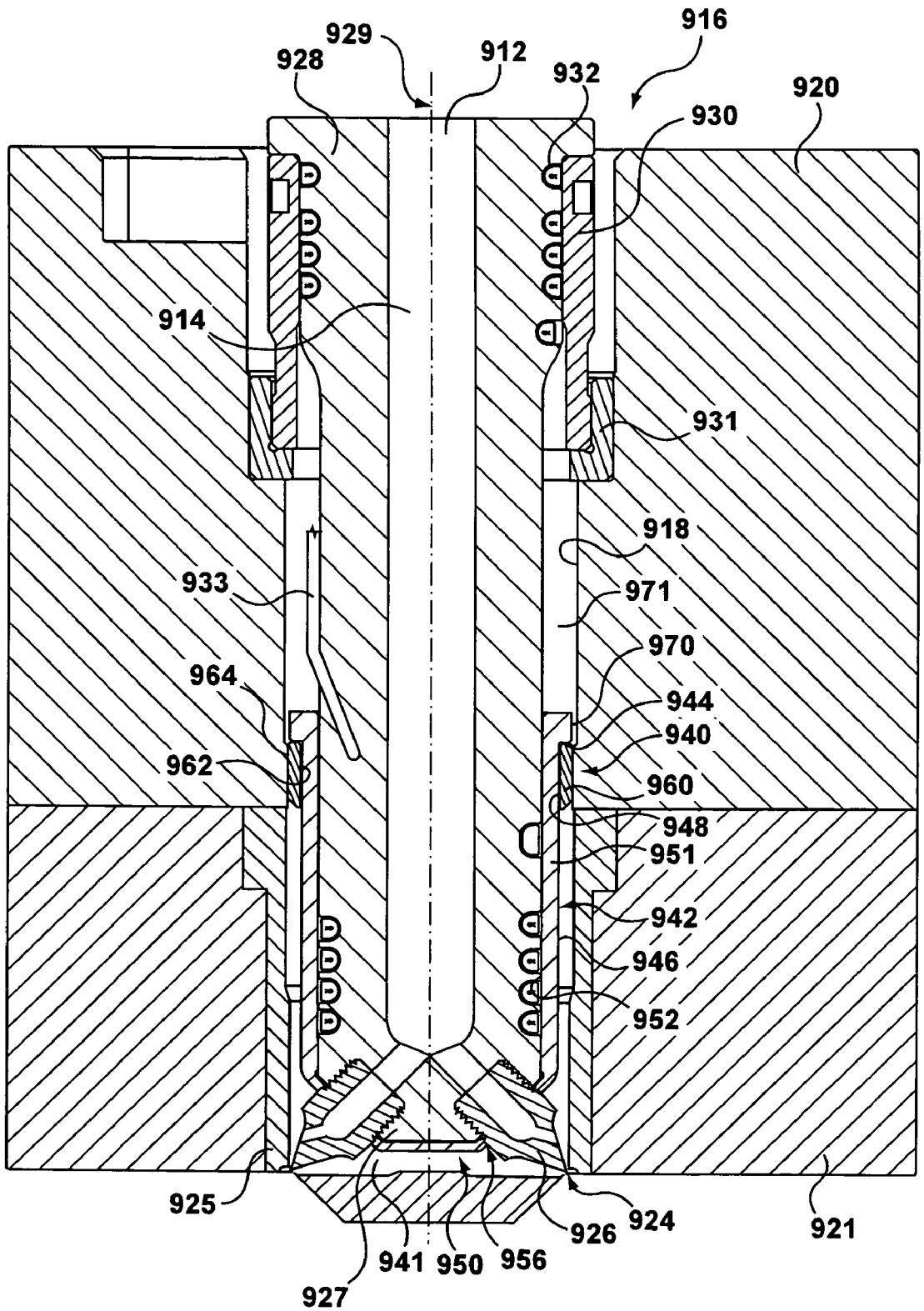
FIG. 9 is a cross-sectional view of a nozzle seal assembly according to another embodiment of the invention.

FIG. 9 shows another embodiment of a hot runner nozzle 916 with a nozzle sealing assembly 940. Hot runner nozzle 916, including a nozzle melt channel 914 with an inlet 912, is located within a nozzle bore 918 that is formed in a mold plate assembly that includes a first mold plate 920 and a second mold plate 921. Nozzle 916 generally includes a nozzle body 928, a plurality of nozzle tips 926 extending radially outward from longitudinal axis 929, a heating element 932 and a thermocouple 933.

Nozzle sealing assembly 940 seals nozzle 916 within bore 918. Nozzle sealing assembly 940 includes a nozzle seal cap 942 and a sealing ring 960. The configuration of nozzle sealing assembly 940 provides a gap 941 for the melt to flow adjacent to mold gates 924, prevents the melt from flowing into a gap 971 upstream of nozzle sealing assembly 940, and restricts heat transfer from heated nozzle 916 to cooled mold plate 920.

Nozzle seal cap 942 includes a base portion 950 and a sidewall portion 951 that extends upward from base portion 950. The inner surface of base portion 950 is configured to compliment the outer surface of the tip portion 927 of nozzle body 928 so that base portion 950 contacts the tip portion 927 of nozzle body 928. In addition, nozzle tip apertures 956 are provided so that nozzle tips 926 may be mounted to nozzle body 928. A sealing ring mounting surface 948 is provided on an outer surface 946 of sidewall portion 951 and a shoulder 944 is provided adjacent to sealing ring mounting surface 948. The combination of mounting surface 948 and shoulder 944 locates sealing ring 960 on nozzle seal cap 942.

Sealing ring 960 is generally a cylindrical sleeve that includes an inner surface 962 and an outer surface 964. Inner surface 962 fits onto a mounting surface 948 of nozzle seal cap 942 and sealing ring 960 may be designed to provide a sliding fit or a press fit with nozzle seal cap 942. Outer, or mold contacting, surface 964 of sealing ring 960 is dimensioned to provide sliding contact with the adjacent mold plate 920.

The heat transfer path through nozzle seal assembly is similar to the heat transfer path through the previously described embodiments. However, in nozzle sealing assembly 940, the entire length of the inside surface 952 of sidewall portion 951 of nozzle seal cap 942 contacts the outside surface of nozzle body 928. Thus, heat is able to pass from nozzle body 928 to nozzle seal cap 942 along the entire length of nozzle seal cap 942. Heat that flows into nozzle seal cap 942 may then flow through sidewall portion 951. Nozzle seal cap 942 does not touch any part of mold plate 920, mold plate 921 or mold plate insert 925 because it is spaced from those components by a gap 970, sealing ring 960 and gap 941, collectively. As a result, heat may flow only between nozzle seal cap 942 and mold plate 920 through sealing ring 960.

The embodiment shown in FIG. 9 includes alignment collar bushing 931 in combination with alignment collar 930, as described above with respect to FIG. 3. However, it should be understood that features shown in FIG. 9 can be used can be used in any embodiment described herein, with or without alignment collar bushing 931.

Figure 10:
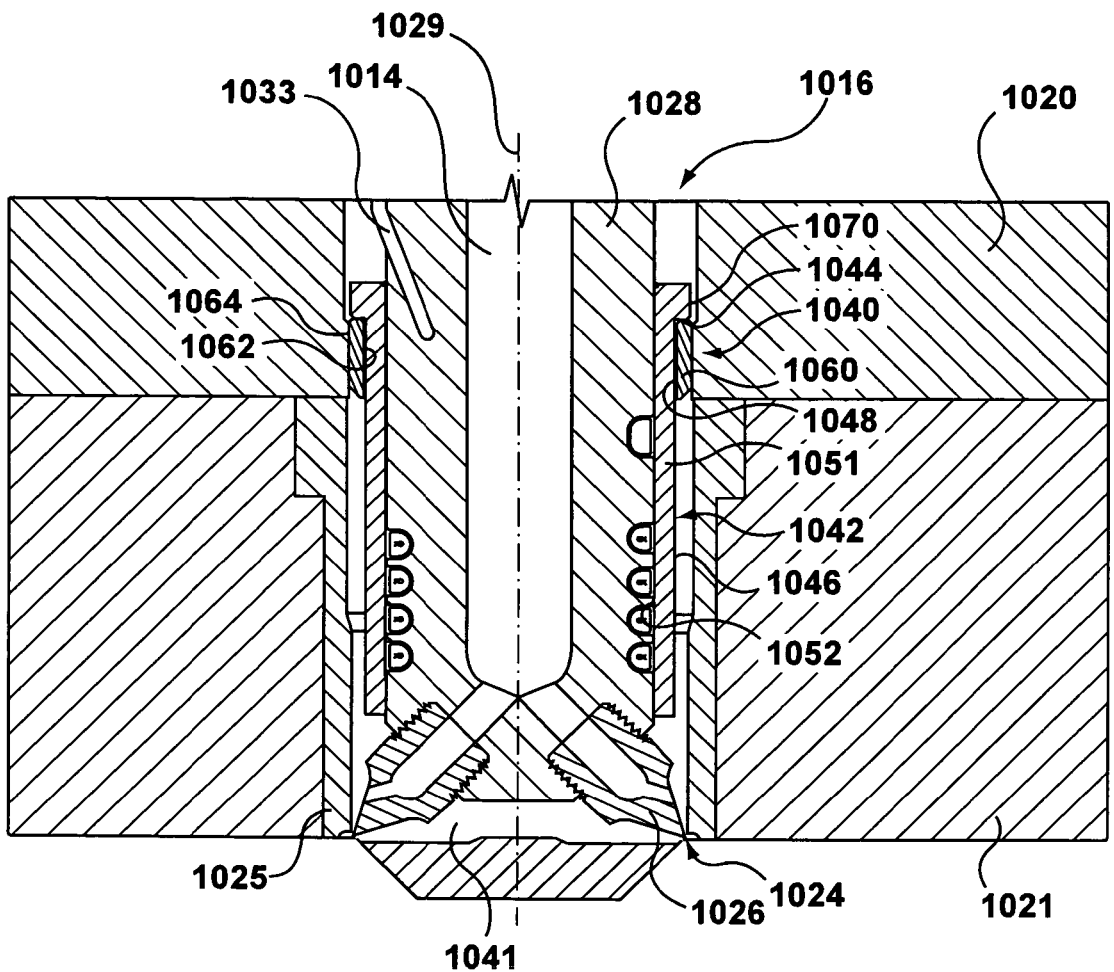
FIG. 10 is a cross-sectional view of a nozzle seal assembly according to another embodiment of the invention.

FIG. 10 shows another embodiment of a hot runner nozzle 1016 with a nozzle sealing assembly 1040. Hot runner nozzle 1016 includes a nozzle melt channel 1014 and is located within a nozzle bore 1018 that is formed in a mold plate assembly that includes a first mold plate 1020 and a second mold plate 1021. Nozzle 1016 generally includes a nozzle body 1028, a plurality of nozzle tips 1026 extending radially outward from longitudinal axis 1029, a heating element 1032 and a thermocouple 1033.

Nozzle sealing assembly 1040 seals nozzle 1016 within bore 1018, as described above with respect to FIGS. 2 and 3. Nozzle sealing assembly 1040 includes a generally cylindrical nozzle seal 1042 that is configured to fit around nozzle body 1028 and a sealing ring 1060 that is configured to fit onto nozzle seal cap 1042. The configuration of nozzle sealing assembly 1040 provides a gap 1041 for the melt to flow adjacent to mold gates 1024, prevents the melt from flowing into a gap 1071 upstream of nozzle sealing assembly 1040 and restricts heat transfer from heated nozzle 1016 to cooled mold plate 1020.

Nozzle seal 1042 includes a sidewall portion 1051 including an inner surface 1052 that is configured to contact the outer surface of nozzle body 1028. A sealing ring mounting surface 1048 is provided on an outer surface 1046 of sidewall portion 1051 and a shoulder 1044 is provided adjacent to sealing ring mounting surface 1048. The combination of mounting surface 1048 and shoulder 1044 locates sealing ring 1060 on nozzle seal 1042.

Sealing ring 1060 is generally a cylindrical sleeve that includes an inner surface 1062 and an outer surface 1064. Inner surface 1062 fits onto mounting surface 1048 of nozzle seal 1042 and sealing ring 1060 may be designed to provide a sliding fit or a press fit with nozzle seal 1042. Outer, or mold contacting, surface 1064 of sealing ring 1060 is dimensioned to provide sliding contact with the adjacent mold plate 1020.

The heat transfer path through nozzle seal assembly is similar to the heat transfer path described in the embodiment of FIG. 9 in that in nozzle sealing assembly 1040, the entire length of the inside surface 1052 of sidewall portion 1051 of nozzle seal 1042 contacts the outside surface of nozzle body 1028. Thus, heat is able to pass from nozzle body 1028 to nozzle seal 1042 along the entire length of nozzle seal cap sidewall portion 1051. However, in contrast to the other embodiment described herein, nozzle seal 1042 is not cup-shaped, therefore there is not base portion as described with respect to the other embodiments. Similar to the other embodiments, nozzle seal 1042 does not touch any part of mold plate 1020, mold plate 1021 or mold plate insert 1025 because it is spaced from those components by a gap 1070, sealing ring 1060 and gap 1041, collectively. As a result, heat may flow only between nozzle seal 1042 and mold plate 1020 through sealing ring 1060.

The embodiment shown in FIG. 10 shows only a lower portion of the nozzle 1016. The upper portion of the nozzle 1016 may be configured like any of the other embodiments described herein or any other configuration as would be known by those skilled in the art. Further, the nozzle seal 1042 of FIG. 10, without a base portion, may be substituted for any of the nozzle seal caps of any of the other embodiments and features described with respect to the other embodiments may be incorporated into the embodiment of FIG. 10.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A hot runner system, comprising
a manifold defining a manifold melt channel, the manifold being configured to receive melt from a melt source;
a nozzle including a nozzle body and at least one nozzle tip, the nozzle being coupled to the manifold, wherein the nozzle defines a nozzle melt channel that is in fluid communication with the manifold melt channel; and
a nozzle sealing assembly including
a cup-shaped nozzle seal cap coupled to the nozzle body and surrounding a tip portion of the nozzle body, the nozzle seal cap including at least one nozzle tip aperture; and
a sealing ring coupled to an outer surface of the nozzle seal cap,
wherein the at least one nozzle tip extends through the at least one nozzle tip aperture and is coupled to the nozzle body.

2. The hot runner system of claim 1, wherein the nozzle seal cap is configured such that there is a gap between a portion of an inner surface of the nozzle seal cap and a portion of an outer surface of the nozzle body.

3. The hot runner system of claim 1, wherein the nozzle includes an annular alignment collar coupled to an upper portion of the nozzle body such that it at least partially surrounds the upper portion of the nozzle body.

4. The hot runner system of claim 3, wherein the nozzle includes an annular collar bushing coupled to a lower end of the alignment collar.

5. The hot runner system of claim 4, wherein the alignment collar bushing has an L-shaped cross-section.

6. The hot runner system of claim 1, wherein the nozzle includes at least one nozzle tip retainer that threadably engages the nozzle body and couples the nozzle tip to the nozzle body.

7. The hot runner system of claim 1, wherein the nozzle includes a plurality of nozzle tips.

8. The hot runner system of claim 1, wherein the nozzle seal cap is coupled to the nozzle body by a cap mounting pin.

9. The hot runner system of claim 1, wherein the nozzle seal cap is press fit onto the nozzle body.

10. The hot runner system of claim 1, wherein the sealing ring includes at least one thermal rib extending from an outer surface of the sealing ring.

11. An edge-gated hot runner nozzle, comprising:
a nozzle body including an upper head portion, a tip portion and a nozzle melt channel;
a plurality of nozzle tips coupled to the tip portion of the nozzle body; and
a sealing assembly including
a cup-shaped nozzle seal cap surrounding and abutting the tip portion of the nozzle body and including a plurality of nozzle tip apertures; and
a sealing ring coupled to an outer surface of the nozzle seal cap,
wherein each of the plurality of nozzle tips is coupled to the nozzle body and extends through a respective nozzle tip aperture.

12. The edge-gated hot runner nozzle of claim 11, wherein the nozzle seal cap is configured such that there is a gap between a portion of an inner surface of the nozzle seal cap and a portion of an outer surface of the nozzle body.

13. The edge-gated hot runner nozzle of claim 11, further comprising:
an annular alignment collar coupled to the upper portion of the nozzle body such that it at least partially surrounds the upper portion of the nozzle body.

14. The edge-gated hot runner nozzle of claim 13, further comprising:
an annular cylindrical alignment collar bushing coupled to a lower end of the alignment collar.

15. The edge-gated hot runner nozzle of claim 14, wherein the alignment collar bushing has an L-shaped cross-section.

16. The edge-gated hot runner nozzle of claim 11, further comprising:
a plurality of nozzle retainers, wherein each nozzle retainer threadably engages the nozzle body to couple a respective nozzle tip to the nozzle body.

17. The edge-gated hot runner nozzle of claim 11, wherein the nozzle seal cap is pinned to the nozzle body.

18. The edge-gated hot runner nozzle of claim 11, wherein the nozzle seal cap is press fit onto the nozzle body.

19. The edge-gated hot runner nozzle of claim 11, wherein the sealing ring includes at least one thermal rib extending from an outer surface of the sealing ring.

20. A hot runner system, comprising
a manifold defining a manifold melt channel, the manifold being configured to receive melt from a melt source;
an edge-gated nozzle including a nozzle body and a plurality of nozzle tips, the nozzle being coupled to the manifold, wherein the nozzle defines a nozzle melt channel that is in fluid communication with the manifold melt channel; and
a nozzle sealing assembly including
a cup-shaped nozzle seal cap surrounding a tip portion of the nozzle body and including a plurality of tip apertures; and
a sealing ring coupled to an outer surface of the nozzle seal cap,
wherein the nozzle tips extend through a respective tip aperture and are threadably coupled to the nozzle body, and
wherein the nozzle seal cap is configured such that there is a gap between a portion of an inner surface of the nozzle seal cap and a portion of an outer surface of the nozzle body.

21. A hot runner system, comprising
a manifold defining a manifold melt channel, the manifold being configured to receive melt from a melt source;
a nozzle including a nozzle body and at least one nozzle tip, the nozzle being coupled to the manifold and disposed within a cavity in a mold plate, wherein the nozzle defines a nozzle melt channel that is in fluid communication with the manifold melt channel; and a nozzle sealing assembly including a nozzle seal coupled to the nozzle body and surrounding a portion of the nozzle body, wherein the nozzle seal includes at least one nozzle tip aperture, wherein the at least one nozzle up extends through the at least one nozzle tip aperture and is coupled to the nozzle body, wherein at least a portion of an inner surface of the nozzle seal contacts an outer surface of the nozzle body, wherein an outer surface of the nozzle seal does not contact the mold plate; and a sealing ring coupled to the outer surface of the nozzle seal, wherein the sealing ring seals a gap between the outer surface of the nozzle seal and the mold plate.

22. The hot runner system of claim 21, wherein the nozzle seal is configured such that there is a gap between a portion of an inner surface of the nozzle seal and a portion of an outer surface of the nozzle body.

23. The hot runner system of claim 21, wherein the nozzle seal is cup-shaped.

24. The hot runner system of claim 22, wherein the nozzle includes at least one nozzle tip retainer that threadably engages the nozzle body and couples the nozzle tip to the nozzle body.

25. The hot runner system of claim 21, wherein the nozzle includes a plurality of nozzle tips.

26. The hot runner system of claim 21, wherein the nozzle seal is coupled to the nozzle body by a mounting pin.

27. The hot runner system of claim 23, wherein the nozzle seal is press fit onto the nozzle body.

* * * * *